H. W. WINTER
MARKING MACHINE.
APPLICATION FILED APR. 2, 1915.
1,400,708.
Patented Dec. 20, 1921.
2 SHEETS—SHEET 2.
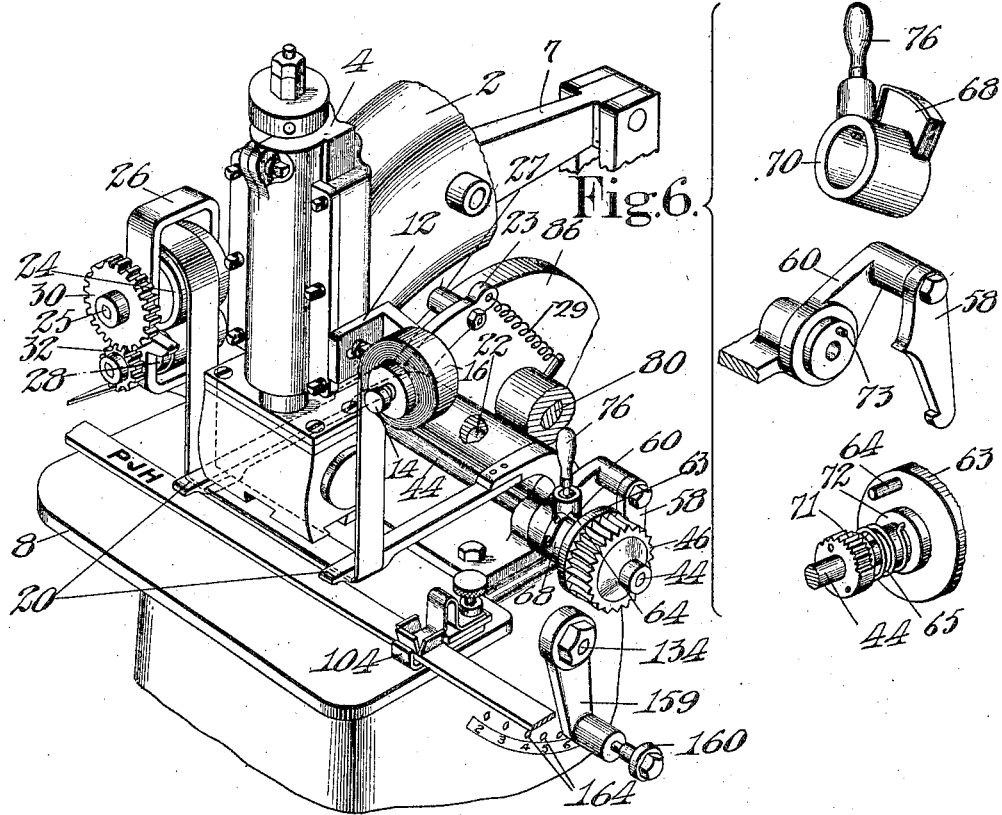
Fig. 6.
Fig. 4.
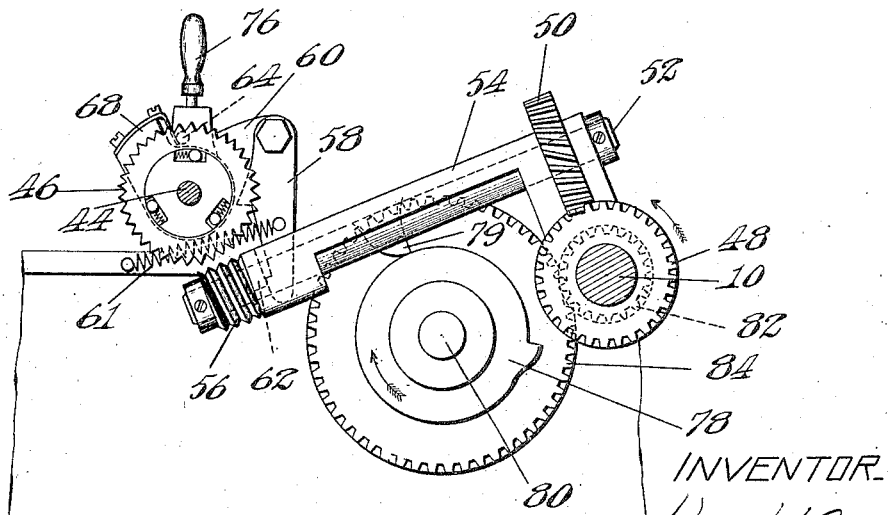
Fig. 5.

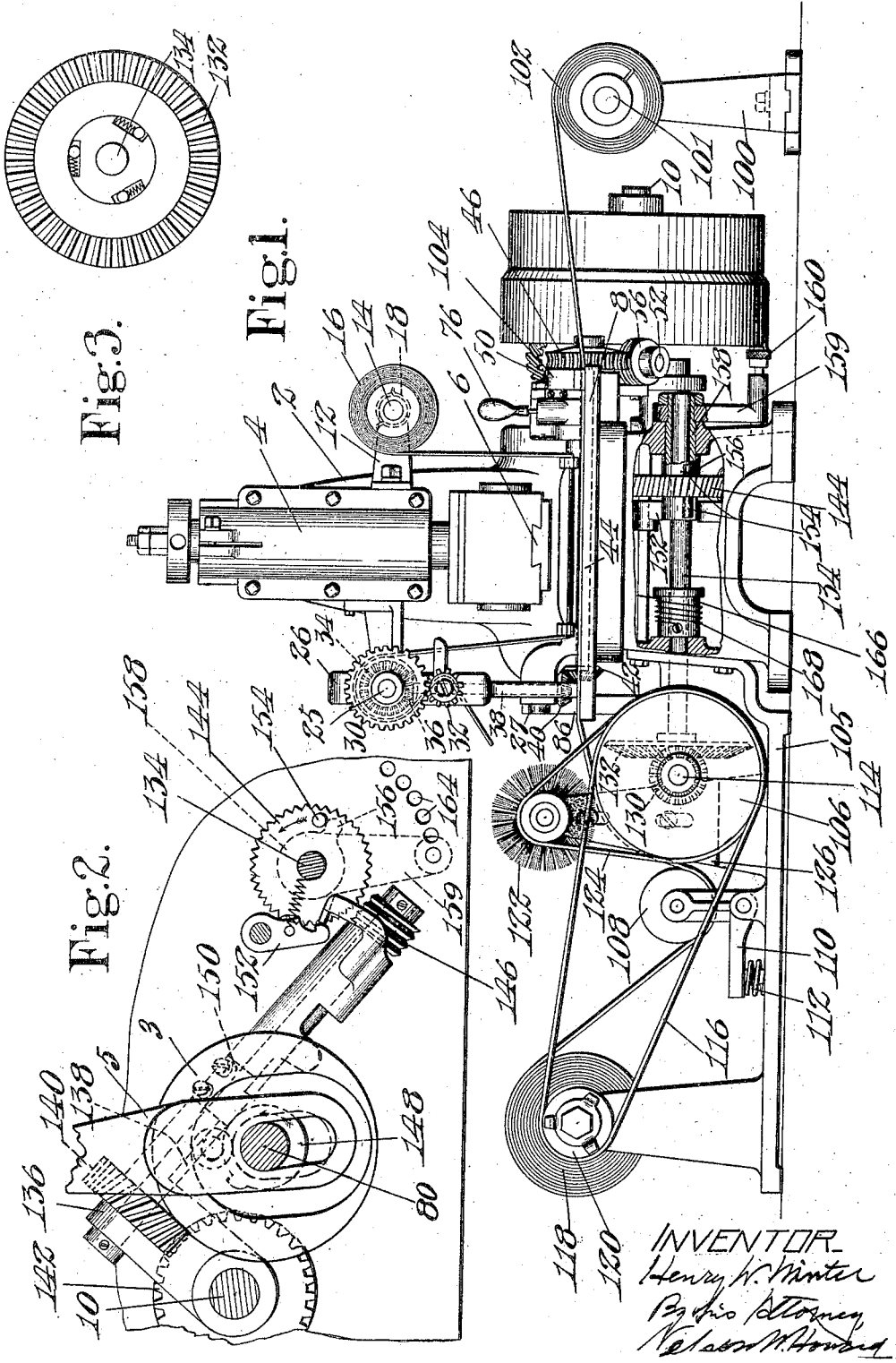

UNITED STATES PATENT OFFICE.

HENRY W. WINTER, OF METHUEN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MARKING-MACHINE.

1,400,708.   Specification of Letters Patent.   Patented Dec. 20, 1921.

Application filed April 2, 1915. Serial No. 18,768.

*To all whom it may concern:*

Be it known that I, HENRY W. WINTER, a citizen of the United States, residing at Methuen, in the county of Essex and State of Massachusetts, have invented certain Improvements in Marking-Machines, of which the following description, in connection with the accompanying drawings, is a specification, like reference characters on the drawings indicating like parts in the several figures.

This invention relates to machines for marking by embossing or otherwise upon sheet material, especially portions of boots and shoes.

Objects of the invention are to improve the construction and organization of machines of this type, to increase the speed of their operation by rendering them automatic in action, to improve their accuracy and to adapt them for certain operations which it has not been possible to effect satisfactorily by machines of this class as heretofore constructed.

An important feature of the invention consists in novel mechanism for presenting automatically gold leaf or other stamping medium in strip or ribbon form in position between the work and the stamping die. As herein shown this is effected by feeding the strip in a path adjacent to the surface of the work to be stamped and the embossing operation is effected by forcing the strip against the work by a heated die to transfer and impress the medium thereon. After each impression the strip of stamping medium is advanced to bring a fresh portion thereof into stamping position.

Other features of the invention relate more particularly to improved mechanism for intermittently advancing a strip of stamping medium and applying it to the work. In the preferred construction, a die is mounted to move toward a work table, and the strip is drawn from a supply reel and fed intermittently between the die and the work. A pair of oscillating fingers guide the strip normally out of contact with the die and the work but serve to move the strip into contact with the work in advance of the die and to strip the material from the die following an impression.

Machines of the type under discussion are employed to a large extent for embossing the top stay material of boots and shoes. The employment of the machine herein disclosed for embossing top stays of completed boots is within the scope of the invention. I have found, however, that the top stay material may be embossed with good advantage while in the strip form, being subsequently cut into pieces of the proper length and incorporated in the boot as a part of its lining. With these conditions in view an important feature of the invention consists broadly in the provision of a machine constructed and arranged to present in stamping position successive portions of a continuous strip or ribbon of material to be stamped, together with means for marking by embossing or otherwise each successive portion of the work so presented.

As herein shown feeding means is provided by which material to be stamped in strip form may be fed into stamping position beneath the strip of stamping medium. The combination of coöperating feeding mechanisms arranged to present in operative position successive portions of stamping medium and material to be stamped is believed to be novel and constitutes an important feature of the invention.

Another feature of the invention consists in the provision of novel feeding means for the material to be stamped having provision for adjustment whereby the spacing of the successive impressions on the strip may be varied and controlled in accordance with the requirements of the work in hand. For example, the length of the top stay material required in boots of different sizes varies considerably. The present invention contemplates the provision of such adjustment as to allow for these variations.

These and other features of the invention will be best understood and appreciated from the following description of a preferred embodiment thereof selected for purposes of illustration and shown in the accompanying drawings, in which:—

Figure 1 is a view of the machine in front elevation with a portion of the frame broken away;

Fig. 2 is a view within the machine casing of portions of the leather strip feeding mechanism;

Fig. 3 is a detail of the same mechanism;
Fig. 4 is a view in perspective of the machine showing the principal operating parts;
Fig. 5 is a view in side elevation of the feeding mechanism for the stamping strip, and
Fig. 6 is a view in perspective of portions of the stamping strip feeding mechanism.

The invention is herein shown as embodied in a machine of the type disclosed in my prior Patent No. 1,301,890, April 29, 1919, to which reference may be had for details not herein shown. It will be understood, however, that the invention is not limited in its application to that or to any particular marking machine.

The machine herein illustrated has a frame 2 with an overhanging portion in which is mounted a vertically reciprocating die carrier 4 for a stamping die 6. Beneath and in line with the stamping die is formed a work table 8. The frame also has journals for a driving shaft 10 carrying a suitable pulley by which power may be applied to the machine. Mechanism is also provided for starting and stopping the machine, but is not herein shown as it forms no part of the present invention. The die carrier is operated from a cam 3 on a counter shaft 80, see Fig. 2, acting through a substantially vertical link 5 which is connected to the rear end of a lever 7 substantially as shown in my prior application.

Upon one side of the head of the frame 2 is adjustably secured a bracket 12 carrying a spindle 14 adapted to receive a reel of stamping medium in the form of a continuous strip. This strip will be hereinafter referred to as the stamping strip and may comprise any material suitable for the intended purpose such as a paper strip having bronze powder or gold leaf applied to one surface thereof, which medium is adapted to be transferred to and embossed upon the work when acted upon by the die. A coil 16 is frictionally held upon the spindle 14 and a torsion spring 18 is provided for frictionally engaging the core of the coil and imparting thereto a slight reverse movement when permitted for taking up slack in the stamping strip.

The stamping strip is led downwardly and guided transversely beneath the die 6 by a pair of guide fingers 20 secured at the rear end to a rock shaft 22. At the left side of the die the stamping strip runs upwardly and about a feed roller 24 fast to a shaft 25 journaled in a bracket 26 secured to the left side of the machine frame. Beneath the feed roller 24 is shown a second feed roller 28, the stamping strip being arranged to pass inwardly between the two feed rollers and then outwardly to any suitable receptacle for the waste stamping strip. The upper feed roller 24 turns with a pinion 30 which meshes with a pinion 32 on the lower feed roll 28. The feed rollers 24 and 28 are driven through the shaft 25 which extends rearwardly and has secured thereto a beveled gear 34. The gear 34 is arranged to mesh with a beveled gear 36 carried by the upper end of a vertical shaft 38 which at its lower end carries a beveled gear 40 meshing with a beveled gear 42 on the left end of a shaft 44 extending horizontally across the machine. On its right end the shaft 44 carries a worm wheel 46. The worm wheel 46 is driven from the main shaft through the mechanism illustrated in Fig. 5 and which will now be described. The main shaft 10 carries a spiral gear 48 arranged in mesh with a corresponding spiral gear 50 fast to a shaft 52 journaled in a swinging bearing bracket 54. The bracket 54 is arranged for pivotal movement about the shaft 10 in such a way that the driving connection between the gears 48 and 50 will not be interrupted when the bracket is moved. At its lower and forward end the shaft 52 carries a worm 56 which is arranged to mesh with the worm wheel 46 when the bracket 54 is swung upwardly. A pawl 58 pivotally mounted on a stationary arm 60 is arranged to engage a projection 62 upon the side of the bracket 54 and hold the bracket in its elevated position to maintain a driving connection between the worm 56 and the worm wheel 46. A spring 61 holds the pawl 58 in operative position but allows it to be displaced toward the right, in Fig. 5, to permit disengagement of the worm 56 after a predetermined interval. For this purpose a disk 63 is provided upon the shaft 44 and a knock-off pin 64 is set in the disk in such position as to trip the pawl 58 when turned sufficiently to encounter it. The disk 63 is loosely mounted upon the shaft 44 and is connected with a torsion spring 65 which tends always to rotate it in a direction opposite to that in which the worm wheel 46 is turned and to return the said pin 64 always to an initial position determined by an adjustable abutment 68. The abutment 68 is formed on a hub 70 journaled on a pair of collars 71, 72 on the shaft 44. The collar 72 is formed as a part of the disk 63 and receives one end of the torsion spring 65. The collar 71 is loose upon the shaft 44 but is held in place by a stationary pin 73 which projects from the hub of the arm 60 into a recess in the face of the collar. The periphery of the collar 71 is provided with ratchet teeth in which engages a pawl formed on the inner end of a handle 76 yieldingly mounted in a boss projecting from the hub 70. It will therefore be seen that the abutment member 68 may be set in any desired position by retracting the pawl and turning the handle 76 until it engages in the desired ratchet tooth. The initial position of the knock-off pin 64 is simultaneously adjusted as the torsion spring 65 will hold this pin against the face of the abutment. In this way the amount of rotation imparted to the worm wheel 46 may be controlled, for example, when the handle 76 is set in the position shown in Fig. 5 the knock-off pin will travel about one-quarter of a revolution before it trips the pawl 58, whereas if the handle 76 were swung so as to extend horizontally to the left, in Fig. 5, the knock-off pin 64 would travel substantially one half of a revolution before tripping the pawl 58. It will be understood that the disk 63 is fast to or formed integrally with the worm wheel 46. Between the worm wheel 46 and the shaft 44 is interposed a roller clutch which permits reverse movement of the worm wheel and disk under the actuation of the torsion spring 65 as soon as the worm 56 is disengaged.

The bracket 54 is swung upwardly to bring the worm 56 into mesh with the worm wheel 46, after the machine is started, by a cam 78 mounted on the cam shaft 80 and driven by a gear wheel 82 on the main shaft through a gear 84 on the cam shaft. As shown in Fig. 5 the cam 78 is provided with a projection arranged to encounter another projection 79 on the bracket 54.

From the foregoing description it will be plain that at an interval after starting the machine the feed rollers 24 and 28 are rotated to draw the stamping strip beneath the die and that the extent of this movement is preliminarily determined by the setting of the handle 76.

The guide fingers 20 are provided at their forward ends with slots through which the stamping strip passes. When the die is moved toward the work the fingers 20 are depressed in advance of it carrying the stamping strip into close proximity to the surface of the work above the table and drawing a length of fresh strip from the coil 16, whereupon engagement of the strip with the work is caused by the movement of the stamping die. After the impression the fingers 20 are elevated to separate the stamping strip from the work. Their upward movement, however, is arrested before the die reaches its uppermost position so that they also serve to separate the strip from the face of the die to which it tends to adhere. The required movement of the fingers 20 is imparted to them by a cam 86 secured to the left end of the cam shaft 80. To this end the rock shaft 22 carries on its left end a cam arm 23 carrying a cam roller 27 which is arranged to run on the periphery of the cam 86. A spring 29, see Fig. 4, serves to maintain the cam roller 27 against the periphery of the cam 86 and to hold the guide fingers 20 normally in elevated position. It will be noted that the cam 78 is so set as to allow a sufficient time for the entire impression to take place before it sets the stamping strip feeding mechanism in operation.

As herein shown the machine is adapted to operate upon a continuous strip or ribbon, such for example as the material used for top stays of boots and shoes. It will be understood, however, that the mechanism thus far described constitutes a complete operative machine for embossing or otherwise marking separate pieces of work. For example, if it is desired to emboss the top stay after it has been incorporated in the upper of a shoe the machine hereinabove described may be utilized without substantial modification. When it is desired to operate upon a strip of continuous material the mechanism now to be described may be employed to good advantage.

Referring again to Fig. 1 a standard 100 is provided at the right hand side of the machine having a spindle 101 for the reception of a coil 102 of ribbon to be stamped. An adjustable gage member 104 is mounted at one side of the work table 8 for the purpose of guiding the ribbon in a path beneath the die. At the left hand side of the machine is arranged a driven feed roller 106 over which the ribbon passes and against which it is pressed by an idle roller 108 mounted in one arm of a bell crank lever 110. The lever 110 is pivoted between ears extending upwardly from an auxiliary base plate 105 adapted to be bolted to the machine frame and to carry portions of the ribbon feeding mechanism. A compression spring 112 holds the idle roller 108 yieldingly against the periphery of the feed roller 106. A receiving reel 118 is journaled between standards formed at the left hand side of the base plate 105 and is arranged to be driven frictionally by a pulley 120. Above the feed roller 106 is adjustably mounted a cleaning brush 122 which acts upon the surface of the ribbon as it is fed over the roller and removes from it all surplus stamping medium.

The feed roller 106 is mounted upon a shaft 114 which also carries a belt pulley of the same diameter. A driving belt 116 passes to this pulley and the pulley 120 which drives the receiving roll. A second belt 124 is also provided for driving the brush 122. The pulley 120 is made of such size as to insure rotation of the receiving coil at a sufficient speed to take care of all the ribbon that may be fed to it while the frictional connection between it and the receiving coil permits slipping which compensates for the increased speed of peripheral rotation incident to the increased diameter of the receiving coil. The brush 122 is journaled in the vertically adjustable supporting member 126.

At its rear end the shaft 114 carries a beveled gear 130 arranged to mesh with a corresponding beveled gear 132 on the left end of a shaft 134 which extends transversely across the frame somewhat below and in advance of the shaft 44. Adjustable mechanism for intermittently rotating the shaft 134 to feed the work is provided which is of substantially the same character as that already described in connection with the stamping strip feed. This will now be described. The main shaft 10 carries between the sides of the machine frame a pivoted bracket 136 in which is journaled a worm shaft 138 carrying at its upper end a spiral gear 140 arranged to mesh with a corresponding spiral gear 142 on the shaft 10. The transverse shaft 134 carries a worm wheel 144 which is arranged to be driven periodically by a worm 146 on the forward end of the shaft 138. The shaft 80, above referred to, carries a cam 148 with a projection arranged to engage a hardened piece 150 secured to the side of the bracket 136 and to swing the bracket upwardly carrying the worm 146 into mesh with the worm wheel 144. A pawl 152 is arranged to latch the bracket 136 in operative position and the knock-off pin 154 on the worm wheel 144 is arranged to trip the pawl 152 when rotated sufficiently to encounter it. The initial position of the knock-off pin 154 is determined by an adjustable stop piece 156 projecting from a sleeve 158 on the shaft 134 as shown in Figs. 1 and 2. At its outer end the sleeve 158 is provided with a crank handle 159 carrying a spring locking pin 160. By turning the handle 159 the initial position of the stop piece 156 and of the knock-off pin 154 may be so determined that the extent of feeding movement imparted to the feed roller 106 will be sufficient to advance the leather strip by exactly the desired amount. The spring pin 160 in the handle 159 serves to maintain the feeding mechanism in its adjusted position by entering one of a series of holes 164 formed in the machine frame. For convenience in handling the top stay material for boots the holes 164 are arranged to correspond with the various boot sizes as shown in Fig. 4. If it is desired to stamp fifty feet of top stay material for No. 7 boots the handle 159 is swung to the hole in the series 164 which bears the desired designation and thereupon, at each feeding operation, a portion of the leather strip of the appropriate size for a No. 7 boot is advanced through the machine.

Secured to the shaft 134 is a flanged collar 166 as shown in Fig. 1 about which is coiled a torsion spring 168 which is wound up during the driven movement of the shaft and which serves to return the shaft and the worm wheel 144 to their initial positions whenever the worm 146 is disengaged from the worm wheel 144. Reverse movement of the shaft 134 with respect to the beveled gear wheel 132 and the feed rollers is permitted by a one-way connection comprising a roller clutch interposed between the gear and the shaft as shown in Fig. 3.

The adjustment of the stamping strip feeding mechanism for the stamping strip allows for the width of the particular embossing die being used. As already explained this adjustment is effected independently of the adjustment of the strip to be stamped. An adjustment of the stamping strip from front to rear is permitted by the connection between the frame and the bracket 12 which carries the coil 16.

In operating the machine above described an embossing die of the desired character is mounted in the carrier and these adjustments are made in the feeding mechanism for the stamping strip so that an amount of the strip shall be presented beneath the die just sufficient to cover the desired impression. If the machine is to be employed for stamping separate shoe parts or parts of a finished boot or shoe such part may be presented upon the work table 8 in position determined by suitable gages. These have been omitted from the drawings to avoid confusion but may be similar to those disclosed in my prior application above identified. The machine is then set in operation whereupon the guide fingers 20 lower the stamping strip upon the work and the die carrier descends forcing the embossing die upon the work through the stamping strip and effecting the impression. The die carrier is then elevated, the feeding mechanism for the strip thrown automatically into action, advancing the strip preparatory to a new impression, the knock-off pin 64 acts and finally the parts are returned to their initial positions. It will be noted that the feeding of the stamping strip takes place at the conclusion of each embossing operation so that the machine comes to rest with everything in readiness for the next impression.

When it is desired to utilize the machine for stamping a continuous strip of material the strip is guided across the work table by the gage 104 and the feeding mechanism therefor is adjusted by swinging the handle 159 into appropriate position. When the machine is set in motion the operation is carried out as above outlined except that the feeding mechanism for the ribbon is also automatically started and the ribbon is advanced after each embossing operation. In handling this material the entire action of the machine is automatic so that it may be depended upon to run through an entire coil of material without attention on the part of the operator.

Having thus described by invention, I claim as new and desire to secure by Letters Patent of the United States:

1. A marking machine, having, in combination, a drive shaft, a work table and die arranged for relative movement under the actuation of the shaft, means for feeding a strip of stamping medium between the table and die for engagement with the die, said feeding means including an initially inoperative connecting shaft constructed and arranged to be moved automatically to associate the feeding means and the drive shaft operatively when the machine is set in operation, and gearing between the connecting shaft and the drive shaft and feeding means.

2. A marking machine having, in combination, a work table, a die carrier arranged for vertical movement with respect to the table and adapted to retain dies of various widths, feeding mechanism for advancing a strip of stamping medium for application by the die to the work on the table and having provision for adjustment to correspond with the width of the die in use and controlling means automatically movable independently of the die carrier to advance the strip across the die.

3. A marking machine having, in combination, a work table, a die carrier movable relatively thereto, strip feeding mechanism, means for automatically starting and stopping said mechanism while the die carrier remains at rest, and means constructed and arranged to fix the stopping means in different positions for controlling the duration of the operation of the feeding mechanism.

4. A marking machine having, in combination, a frame, a die carrier movable therein, a holder for a coil of stamping medium in strip form, and means mounted to oscillate on the frame for engaging and drawing the strip from the coil and across the path of the movable carrier while the carrier remains at rest.

5. A marking machine having, in combination, a stationary frame, a die carrier movable therein, a support for a coil of strip stamping medium mounted on the frame for transverse adjustment, and guiding means for normally retaining the strip suspended beneath the die carrier, said guiding means being movable in advance of the carrier to draw a length of the strip from the coil.

6. In a marking machine, a power shaft, a work table, a die movable relatively to the table to effect an impression, connections from the power shaft to the die to effect movement of the latter, and a pair of parallel, movable guide fingers for guiding a strip of stamping medium between the die and table, and means to arrest the movement of said guide fingers as the die is raised to effect a stripping action of the strip from the die.

7. A marking machine, having in combination, a frame, a die and carrier movable therein, a work table, a rock-shaft, guides secured to the rock-shaft and extending on opposite sides of the die, and means to oscillate the shaft and guides to remove the strip from the work following an impression.

8. A marking machine, having in combination, a work table, a die movable with respect thereto to effect an impression, guide fingers for strip stamping medium located at the sides of the die to maintain the strip parallel to the face of the die, and means to lift said fingers away from the table first to lift the strip from the work and then to remove the strip from the die.

9. A marking machine having, in combination, a movable stamping die, a feed roller for a strip of stamping medium, worm driving mechanism for turning the roller, means for automatically shifting the elements of said mechanism into and out of contact to establish and disestablish connection between said roller and driving mechanism, and means for automatically interrupting such connection after a predetermined but variable interval.

10. In a mechanism for embossing material in continuous strip form, a work table, a die movable with respect thereto to effect an impression, mechanism for feeding a strip of material across the table, and mechanism for feeding a strip of stamping medium in the same direction and parallel to the first strip, between it and the die.

11. A marking machine having, in combination, a reciprocatory stamping head arranged for movement in a vertical path, a coil of stamping medium in strip form mounted upon one side of the path of the head, strip feeding means mounted upon the other side of said path, and automatically operating means for guiding the strip downwardly and then across beneath the head and for moving the strip bodily in advance of the head.

12. A marking machine having, in combination, a work table, a coöperating stamping die, and means for feeding a ribbon to be embossed to the table, said means including a feed roller, a worm wheel having a one-way connection with the feed roller, a driving worm arranged to be automatically engaged and disengaged from the worm wheel, means for determining the interval of the driving engagement, and means for returning the worm wheel to a predetermined initial position at the conclusion of such engagement.

13. In a machine for embossing material in continuous strip form, a power driven die, a driving shaft, mechanism for feeding a strip of material, mechanism for feeding a strip of stamping medium, actuating connections between the driving shaft and the feeding mechanisms, respectively, arranged to be automatically established and interrupted, and means for variably determining the time of interruption of each connection.

14. A marking machine having a stationary frame, a die carrier arranged to reciprocate vertically in the frame, a reel of strip stamping medium mounted on the frame at one side of the movable die carrier, driven feed rollers located at the other side of the die carrier, and means yieldable relatively to the reel for guiding the strip downwardly and across below the face of a die in the carrier and then upwardly to the driven rollers, said guiding means being movable downwardly to carry the strip toward the work in advance of the die.

In testimony whereof I have signed my name to this specification.

HENRY W. WINTER.